UNITED STATES PATENT OFFICE.

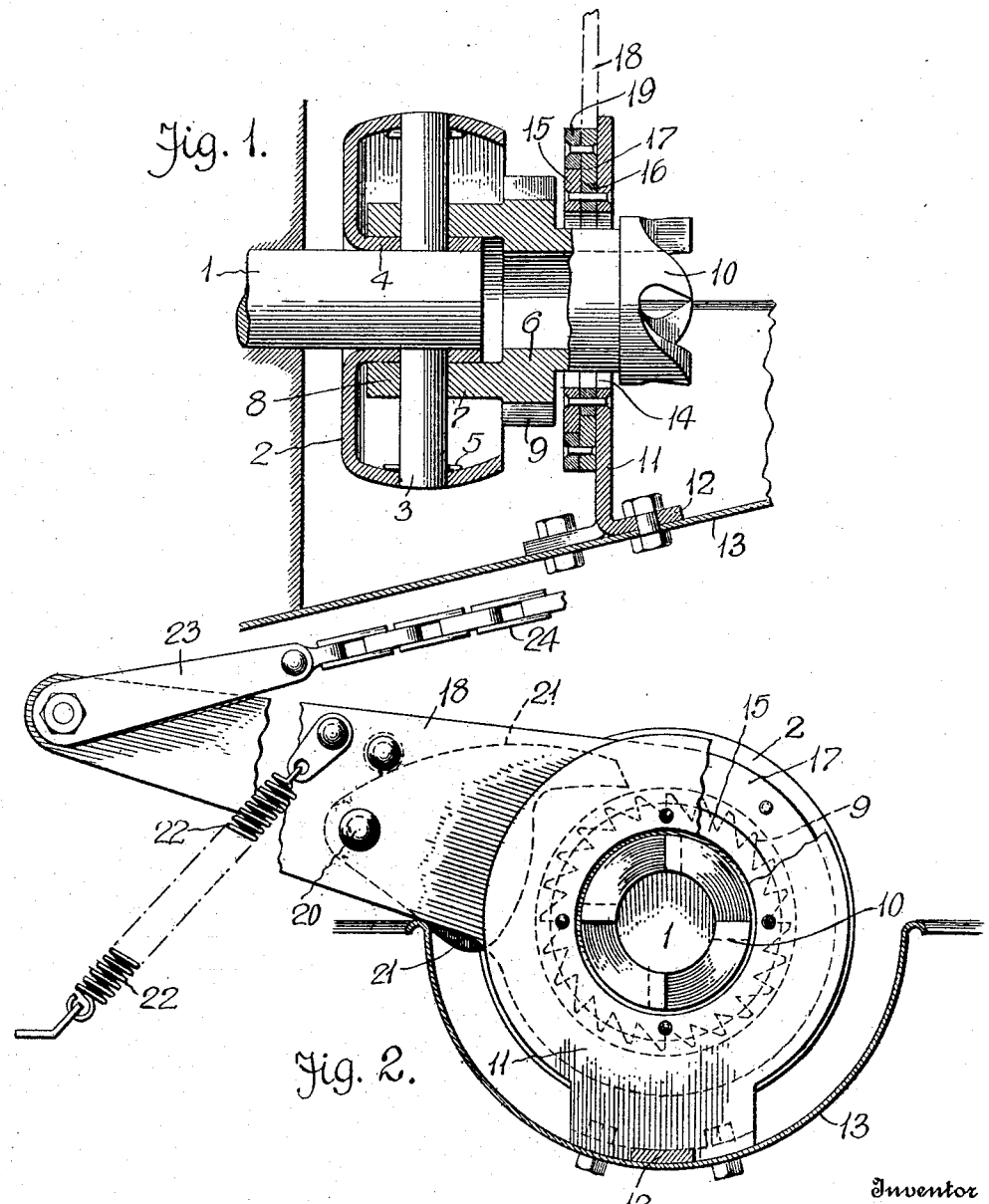

THEODORE E. REYNOLDS, OF DETROIT, MICHIGAN, ASSIGNOR OF ONE-HALF TO ISABELLE M. FARRINGTON, OF DETROIT, MICHIGAN.

AUTOMOBILE-STARTER.

1,223,292.     Specification of Letters Patent.     Patented Apr. 17, 1917.

Application filed May 16, 1916. Serial No. 97,938.

*To all whom it may concern:*

Be it known that I, THEODORE E. REYNOLDS, a citizen of the United States of America, residing at Detroit, in the county of Wayne and State of Michigan, have invented certain new and useful Improvements in Automobile-Starters, of which the following is a specification, reference being had therein to the accompanying drawings.

This invention relates to an automobile starting device adapted to be manually actuated and especially designed for starting explosive engines of "Ford" automobiles. This type of automobile necessitates a compact and cheap starting device, and my invention aims to provide such a starting device that can be easily and quickly installed without practically discarding any part of the Ford equipment.

My invention further resides in matters to be hereinafter described and then claimed, and reference will now be had to the drawings, wherein—

Figure 1 is a longitudinal, sectional view of the starting device, partly in elevation, and Fig. 2 is a front elevation of the same partly broken away.

In the drawing, 1 denotes an engine shaft having the outer end thereof provided with the usual pulley 2, which is fixed upon the shaft by transverse pin 3 passing through the shaft, the hub 4 of the pulley, and extending into the rim thereof, said pin being held against accidental displacement by cotter pins 5 or some fastening means located within the pulley 2. The elements thus far described will be recognized as Ford constructions, and while I am aware of starting devices having been devised for the explosive engines of Ford automobiles, yet I know of no starting device that can be installed without discarding the pulley 2, or making other changes at the outer end of the engine shaft 1.

My starting device includes a coupling sleeve 6 having a hub portion 7, which is apertured, as at 8, whereby the hub portion 7 may be fitted over the hub 4 of the pulley 2 and receive the pin 3 to establish rotative continuity between the coupling sleeve 6 and the engine shaft 1. The coupling sleeve, adjacent the hub portion 7, has a ratchet wheel 9. The outer end of said coupling sleeve terminates in the usual clutch member 10, which permits of an emergency clutch crank being connected thereto for turning over the engine shaft 1.

My starting device further includes an upright 11 suitably secured, for instance as at 12, to the crank case or pan 13 of the Ford engine. The upright 11 has an opening 14 providing clearance for the outer end of the sleeve 6, and suitably connected to the inner side of the upright 11 is an annular guide 15 providing a channel-way 16 for the head 17 of a starting lever 18. The operating lever 18 has the head 17 thereof provided with a bearing ring 19 to ride upon the annular guide 15 while the head 17 of the operating lever extends into the channel-way 16, consequently the operating lever cannot become accidentally displaced relative to the upright 11.

Pivotally connected to the side of the operating lever 18, as at 20, is a gravity pawl 21, adapted to engage the ratchet wheel 9 and rotate said wheel when the operating lever is moved in one direction. The operating lever 18 is held normally inactive by a coiled retractile spring 22 and with the lever in this position, the gravity pawl 21 contacts with the edge of the pan 13, as best shown in Fig. 2 and is held out of engagement with the ratchet wheel 9.

Connected to the outer end of the lever 18 by a link or stirrup 23 is a chain or cable 24 constituting a connection whereby the operating lever 18 may be swung clockwise to impart a similar movement to the ratchet wheel 9 and to the engine shaft 1. The initial movement of the operating lever 18 causes the pawl 21 to engage the ratchet wheel 9 and as said operating lever is moved the engine shaft 1 is turned over sufficiently to start the explosive engine. Should there be a "back fire" or counterclockwise movement of the shaft 1 the gravity pawl 21 is kicked out of engagement with the ratchet wheel by contacting with the edge of the pan 13, and the shaft 1 can rotate counterclockwise without injuring or displacing any part of the starting device.

Considerable importance is attached to the simplicity of construction, particularly the fact that the bracket 11 is supported by the pan and that the sleeve 6 can be easily mounted in the pulley 2 upon the hub 4 thereof thus obviating any special fitting or pulley in connection with the engine shaft.

While in the drawing there is illustrated a preferred embodiment of my invention, it is to be understood that the structural elements are susceptible to such variations and modifications as fall within the scope of the appended claims.

What I claim is:—

In an automobile engine starting device, a pan, a hub adapted to extend into the pulley of an engine shaft and be fixed relative thereto, a ratchet wheel forming part of said hub, a laminated upright carried by said pan, an operating lever loosely held between laminations of said upright, a gravity pawl connected to said operating lever adapted to engage said ratchet wheel and adapted to impinge against said pan to be kicked out of engagement with said ratchet wheel.

In testimony whereof I affix my signature in presence of two witnesses.

THEODORE E. REYNOLDS.

Witnesses:
 KARL H. BUTLER,
 ANNA M. DORR.

Copies of this patent may be obtained for five cents each, by addressing the "Commissioner of Patents, Washington, D. C."